United States Patent

Watanabe et al.

[11] Patent Number: 5,675,460
[45] Date of Patent: Oct. 7, 1997

[54] MAGNETIC HEAD AND METHOD OF PRODUCING THE SAME

[75] Inventors: Toshinori Watanabe, Koide-machi; Fumihito Koike, Nagaoka; Masamichi Saito, Koide-machi, all of Japan

[73] Assignee: Alps Electric Co., Ltd., Tokyo, Japan

[21] Appl. No.: 541,784

[22] Filed: Oct. 10, 1995

Related U.S. Application Data

[62] Division of Ser. No. 312,492, Sep. 26, 1994, abandoned, which is a continuation of Ser. No. 3,193, Jan. 11, 1993, abandoned.

[30] Foreign Application Priority Data

Jan. 16, 1992 [JP] Japan ............... 4-6016
Jan. 28, 1992 [JP] Japan ............... 4-13445

[51] Int. Cl.$^6$ ............... G11B 5/127; G11B 5/133; G11B 5/187
[52] U.S. Cl. ............... 360/120; 360/119; 360/125
[58] Field of Search ............... 360/110, 119, 360/120, 121, 122, 125, 126; 29/603, 603.01, 603.04, 603.12; 428/694 T, 611, 692, 900; 420/125, 126, 127; 148/306

[56] References Cited

U.S. PATENT DOCUMENTS

| | | | |
|---|---|---|---|
| 4,788,611 | 11/1988 | Kobayashi et al. | 360/120 |
| 4,803,338 | 2/1989 | Kumasaka et al. | 360/122 |
| 4,881,989 | 11/1989 | Yoshizawa et al. | 148/302 |
| 4,918,555 | 4/1990 | Yoshizawa et al. | 360/125 |
| 4,953,050 | 8/1990 | Kumura et al. | 360/126 |
| 4,985,089 | 1/1991 | Yoshizawa et al. | 148/303 |
| 5,007,158 | 4/1991 | Ino et al. | 29/603 |
| 5,019,190 | 5/1991 | Sawa et al. | 148/306 |
| 5,020,212 | 6/1991 | Michijima et al. | 29/603 |
| 5,028,280 | 7/1991 | Ihara et al. | 148/306 |
| 5,049,209 | 9/1991 | Sakakima et al. | 148/306 |
| 5,104,464 | 4/1992 | Hasegawa | 148/300 |
| 5,164,870 | 11/1992 | Kato et al. | 360/119 |
| 5,173,823 | 12/1992 | Hasegawa | 360/120 |
| 5,176,806 | 1/1993 | Hasegawa | 204/192 |
| 5,195,004 | 3/1993 | Okuda et al. | 360/126 |
| 5,227,193 | 7/1993 | Hori et al. | 427/131 |
| 5,244,627 | 9/1993 | Katsuki | 420/127 |

FOREIGN PATENT DOCUMENTS

| | | |
|---|---|---|
| 56-83828 | 7/1981 | Japan. |
| 1-66810 | 3/1989 | Japan. |

*Primary Examiner*—Stuart S. Levy
*Assistant Examiner*—David L. Ometz
*Attorney, Agent, or Firm*—Guy W. Shoup; Patrick T. Bever

[57] ABSTRACT

A magnetic head of the type which includes a pair of magnetic cores joined to each other through the intermediation of gap layers, with Fe-type metal magnetic thin films being arranged between the gap layers and the magnetic cores, the metal magnetic thin films being formed of a magnetic material which can be represented by the composition formula: Fe-X-M-C, with the concentration of the element X being higher in the surface portions of the metal magnetic thin films than in the other portions thereof. In the above composition formula, X represents one or two or more of the following elements: Al, Si, Cr, Mo and W, and M represents one or two or more of the following elements: Ti, V, Zr, Nb, Hf and Ta. Due to this construction, the metal magnetic thin films can contain the element X at high concentration in the surface portions thereof, which element combines with oxygen in the surface portions to generate an oxide coating, thereby providing a magnetic head excelling in corrosion resistance. When, in a magnetic head containing Al in the metal magnetic thin films, the Al is contained at higher concentration in the film surface portions, it is possible to generate an Al oxide to improve the corrosion resistance.

1 Claim, 12 Drawing Sheets

ANNEALED AT 823K FOR 2.3ks

MAGNETIC HEAD AND METHOD OF PRODUCING THE SAME

This application is a division of application Ser. No. 08/312,492, filed Sep. 26, 1994, now abandoned, which is a continuation of application Ser. No. 08/003,193, filed Jan. 11, 1993, now abandoned.

BACKGROUND OF THE INVENTION

This invention relates to a metal-in-gap-type magnetic head in which metal magnetic thin films are provided between the magnetic cores and the gap.

Figure 19:
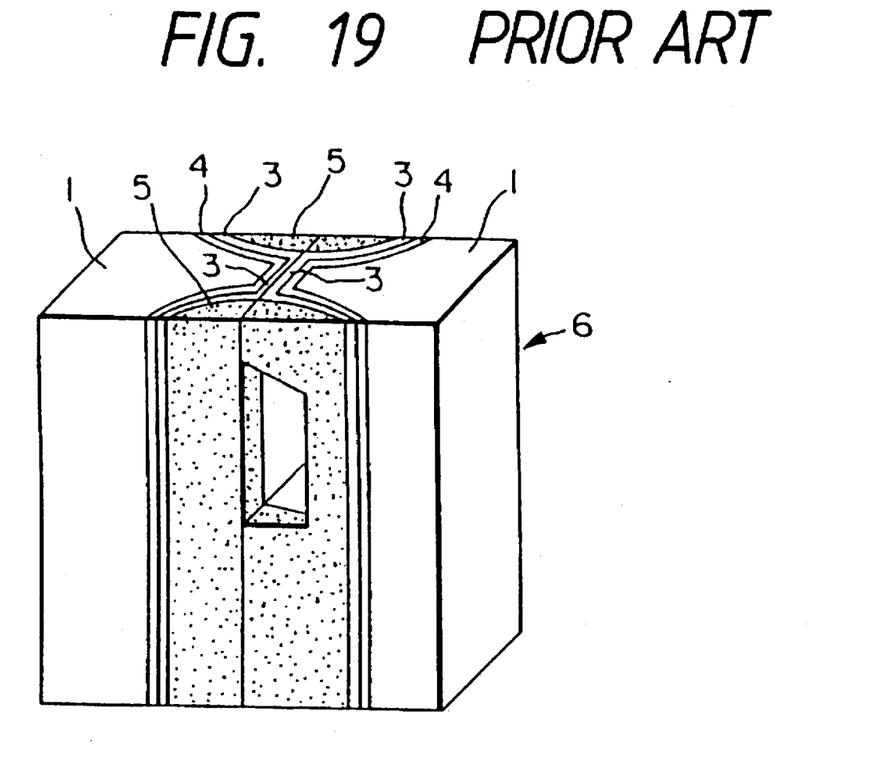
FIG. 19 is a perspective view showing the essential parts of an example of a conventional magnetic head.
Figure 20:
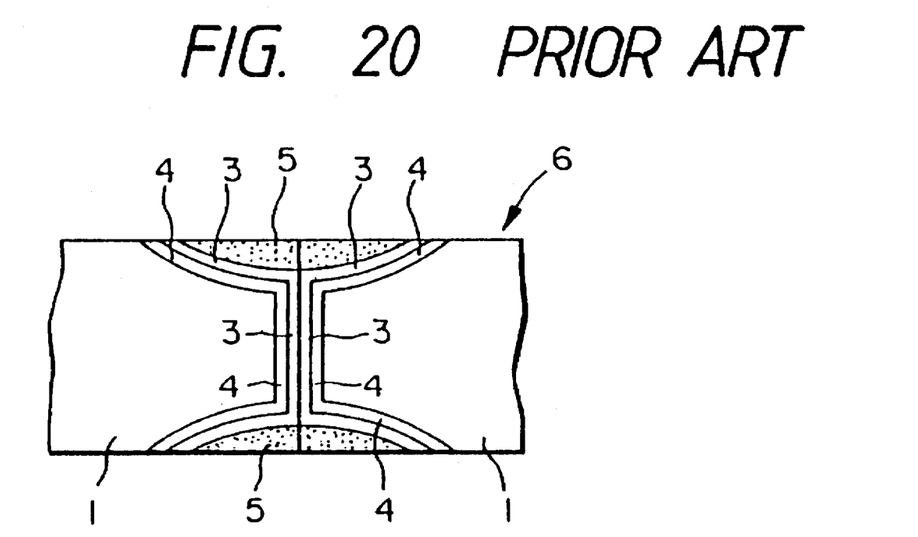
FIG. 20 is a plan view of the magnetic head shown in FIG. 19.

FIGS. 19 and 20 show, as an example of a conventional magnetic head for VTRs or the like, an MIG (metal-in-gap) type magnetic head 6, which includes a pair of ferrite magnetic cores 1 opposed to each other, gap layers 3 arranged between the magnetic cores 1, metal magnetic thin films 4 arranged in the interface sections between the magnetic cores 1 and the gap layers 3, and glass layers 5 joining the magnetic cores 1 to each other.

With this magnetic head, the magnetic field generated in the magnetic gap is stronger and sharper as compared to the magnetic field generated in a magnetic head having no metal magnetic thin films 4, so it is desirably capable of keeping up with the recent increase in the density in magnetic recording. Thus, it is being widely used as a image-recording magnetic head for VTRs, a magnetic head for digital tape recorders, etc.

Conventionally, the magnetic head 6 has been produced in the following manner: first, a pair of core blocks consisting of a magnetic substance such as ferrite are prepared, and grooving is performed on each of these core blocks to form a plurality of recesses and protrusions thereon. A metal magnetic thin film is formed on a part of these recesses and protrusions by sputtering or the like, and then a gap layer consisting, for example, of an SiO$_2$ layer, is formed on the magnetic thin film by sputtering or the like.

Subsequently, the core blocks, with the gap layers having been formed thereon, are brought into mutual abutment through the intermediation of the gap layers, and the spaces defined by the recesses and protrusions of the abutting sections are filled with glass, thereby joining the core blocks to each other. Then, these core blocks, thus joined together, are cut into a plurality of magnetic cores, each of which is finished into a magnetic head. Thus, a plurality of magnetic heads are produced simultaneously from a pair of core blocks.

Generally speaking, the material of the metal thin films 4 of the magnetic head 6, constructed as described above, is an Fe-type magnetic material superior in magnetic properties to the ferrite constituting the magnetic cores 1. Such an Fe-type magnetic material is mainly composed of iron, so that, in many cases, it is rather poor in environmental resistance, and in particular, corrosion resistance.

In view of this, the use of various additional elements has been considered with a view toward improving the corrosion resistance of the metal magnetic thin films. However, adding a large amount of elements for improving corrosion resistance results in a deterioration in the magnetic properties of the metal magnetic thin films.

Another problem in the production of the conventional magnetic head is that the coefficient of thermal expansion of the ferrite constituting the core blocks is different from that of the metal magnetic thin films, with the result that a stress is applied to the core blocks when the metal magnetic thin films contract after the formation thereof. Further, various machining operations, such as grooving and cutting, are performed on the core blocks so that machining distortion is imparted to the core blocks. Thus, in the magnetic cores of the MIG-type magnetic head, distortion is liable to be accumulated in those sections thereof around the gap, which distortion may cause a deterioration in magnetic properties.

In addition, in the above-described conventional magnetic head, the bond strength between metal magnetic thin films and the gap layers consisting of SiO$_2$, and the bond strength between the metal magnetic thin films and the magnetic cores, are not satisfactory, so that the films are liable to be peeled off during the formation thereof.

The present invention has been made in view of the above problems. It is an object of the present invention to provide a magnetic head in which an improvement in corrosion resistance and magnetic properties has been attained by selectively gathering a specific element of the metal magnetic thin films in the surface portions thereof, and a magnetic-head producing method in which machining distortion and thermal distortion can be eliminated by heat treatment during production, thereby providing a magnetic head having improved corrosion resistance and magnetic properties.

The present invention further provides a metal-in-gap-type magnetic head in which the bond strength between the metal magnetic thin films and the gap layers and the bond strength between the magnetic thin films and the ferrite have been improved by adjusting the concentration of a specific element of the metal magnetic thin films and which, by thus ensuring the requisite inter-layer bond strength, can prevent film peeling-off between the metal magnetic thin films and the other layers and, further, attain an improvement in the transverse rupture strength of the metal magnetic thin films.

SUMMARY OF THE INVENTION

To solve the above problems, there is provided, in accordance with a first aspect of this invention, a magnetic head of the type which includes a pair of magnetic cores joined to each other through the intermediation of gap layers, with Fe-type metal magnetic thin films being arranged between the gap layers and the magnetic cores, the above-mentioned metal magnetic thin films being formed of a magnetic material which can be represented by the composition formula: Fe-X-M-C, with the concentration of the element X being higher in the surface portions of the metal magnetic thin films than in the other portions thereof. The element X consists of one or two or more of the following elements: Al, Si, Cr, Mo and W. The element M consists of one or two or more of the following elements: Ti, V, Zr, Nb, Hf and Ta.

In accordance with a second aspect of the present invention, the above problems are solved by establishing, in the above composition formula: Fe-X-M-C, the following conditions by atomic %: $0.5 \leq C \leq 25$, $2 \leq M \leq 25$, $0.2 \leq X \leq 25$, and $50 \leq Fe \leq 95$.

To solve the above problems, in accordance with a third aspect of the present invention, the metal magnetic thin films contain 7 atomic % or more of Al as the element X.

To solve the above problems, there is provided, in a fourth aspect of this invention, a method of producing a magnetic head of the type which includes a pair of magnetic cores joined to each other through the intermediation of gap layers, with metal magnetic thin layers being provided in the interfaces between the gap layers and the magnetic cores, the method comprising the steps of: performing grooving on a pair core blocks consisting of a magnetic substance to form recesses and protrusions thereon, forming metal magnetic thin films and gap layers on these recesses and protrusions by a film formation means; joining the pair of core blocks to each other by means of glass through the intermediation of the gap layers; performing polishing on the core blocks; and performing heat treatment at 200° C. or more on the core blocks which have been polished.

To solve the above problems, in accordance with a fifth aspect of the present invention, the above-described method of producing a magnetic head uses metal magnetic thin films of a magnetic material which can be represented by the composition formula: Fe-X-M-C, where X represents one or two or more of the following elements: Al, Si, Cr, Mo and W, and where M represents one or two or more of the following elements: Ti, Zr, V, Nb, Hf and Ta.

In accordance with a sixth aspect of the present invention, the above problems are solved by establishing, in the above composition formula: Fe-X-M-C, the following conditions by atomic %: $0.5 \leq C \leq 25$, $2 \leq M \leq 25$, $0.2 \leq X \leq 25$, and $50 \leq Fe \leq 95$.

To solve the above problems, in accordance with a seventh aspect of this invention, the magnetic thin films of the above magnetic head, which are formed of a magnetic material that can be expressed by the formula: Fe-X-M-O, are formed of an Fe-type metal magnetic film containing the element X, and the concentration of the element X in the metal magnetic thin films is relatively low in the vicinity of the gap and relatively high in the vicinity of the magnetic cores.

DETAILED DESCRIPTION OF THE INVENTION

Embodiments of this invention will now be described with reference to the drawings.

Figure 1:
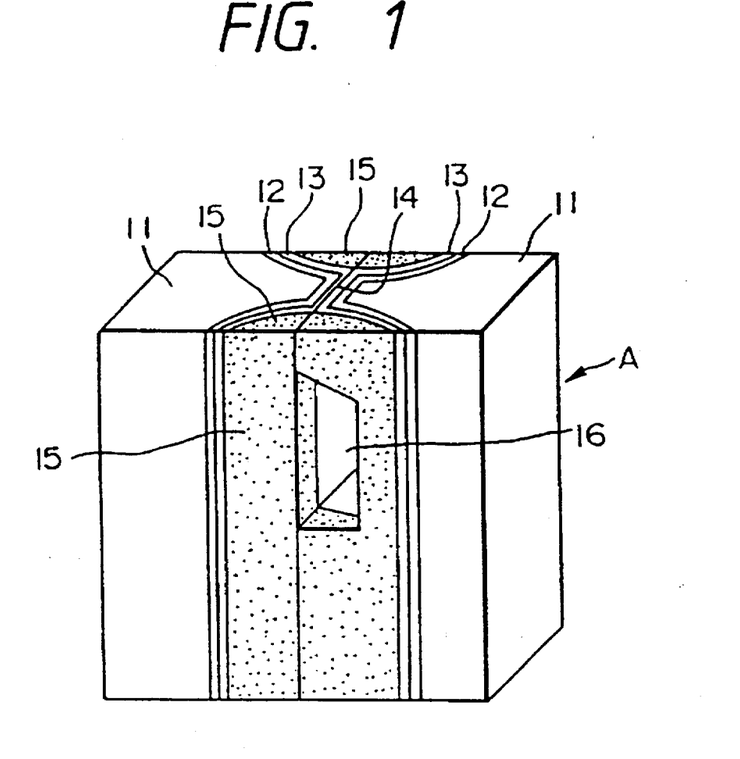
FIG. 1 is a perspective view showing the essential parts of a magnetic head according to a first embodiment of this invention.

FIG. 1 shows a magnetic head A according to a first embodiment of this invention. This magnetic head A is formed as follows: first, a metal magnetic thin film 12 and a gap layer 13 are successively formed on a side of each of a pair of ferrite magnetic cores 11. Then, the pair of magnetic cores 11 are brought into mutual abutment while forming a main gap 14 between the gap layers 13. Subsequently, the magnetic cores 11 are integrally joined to each other by means of glass layers 15. Numeral 16 in FIG. 1 indicates a winding groove. This magnetic head A is a magnetic head of MIG (metal-in-gap) type having metal magnetic thin films 12.

The metal magnetic thin films 12 are formed of an Fe-X-M-C-type magnetic material having a saturation magnetic flux density higher than that of ferrite. In the composition formula: Fe-X-M-C, X represents one or two or more of the following elements: Al, Si, Cr, Mo and W, and M represents one or two or more of the following elements: Ti, V, Zr, Nb, Hf and Ta. Further, it is desirable that the contents by atomic % of the component elements satisfy the following conditions: $0.5 \leq C \leq 25$, $2 \leq M \leq 25$, $0.2 \leq X \leq 25$, and $50 \leq Fe \leq 95$.

In the above composition, Fe (iron) constitutes the main element for providing magnetism. To obtain a saturation magnetic flux density of 10000 G or more, it is desirable that the Fe content be 50 atomic % or more and, to obtain a high saturation magnetic flux density of 15000 G or more, an Fe content of 70 atomic % or more is desirable. The elements M and C (carbon) are the elements needed for acquiring soft magnetic properties. By simultaneously adding specific amounts of M and C to the Fe, the soft magnetic properties of the films can be remarkably improved. To obtain satisfactory soft magnetic properties, it is desirable that the contents of the above elements be in the above ranges.

Further, Si (silicon), Al (aluminum), etc. increase the electrical resistance of the films, so that they help to attain a reduction in eddy current loss, thereby improving the magnetic permeability in high-frequency areas.

Next, a method of producing the magnetic head A, constructed as described above, will be described.

Figure 3:
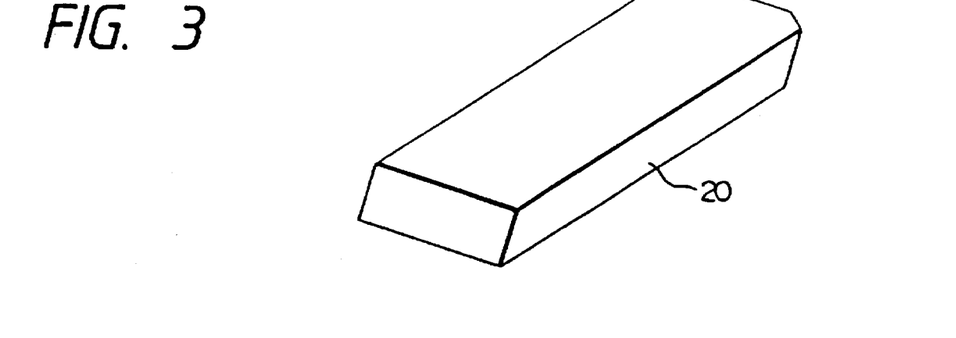
FIG. 3 is a perspective view of a ferrite block used in executing the method of this invention.
Figure 4:
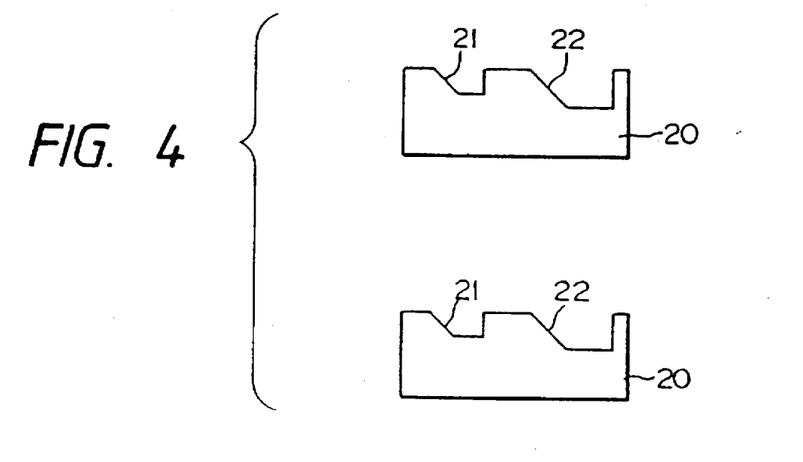
FIG. 4 is a side view of two core blocks which are formed by cutting and on which grooving has been performed.
Figure 5:
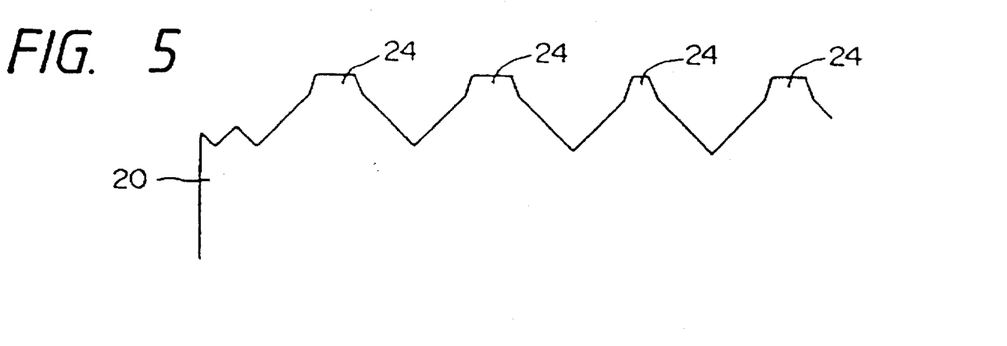
FIG. 5 is a side view showing recesses and protrusions formed on a core block.

To produce the magnetic head A, two prismatic core blocks 20 as shown in FIG. 3, consisting of a magnetic material such as ferrite, are prepared first. Grooving is performed longitudinally on each core block 20 by using a grinder or the like, as shown in FIG. 4, thereby forming a winding groove 21 and a reinforcement groove 22. Then, grooving is performed by using a grinder or the like on each core block 20, with the grooves 21 and 22 having been formed thereon. This time, grooving is performed in a direction perpendicular to the grooves 21 and 22 so as to form a plurality of protrusions 24 as shown in FIG. 5.

Figure 6:
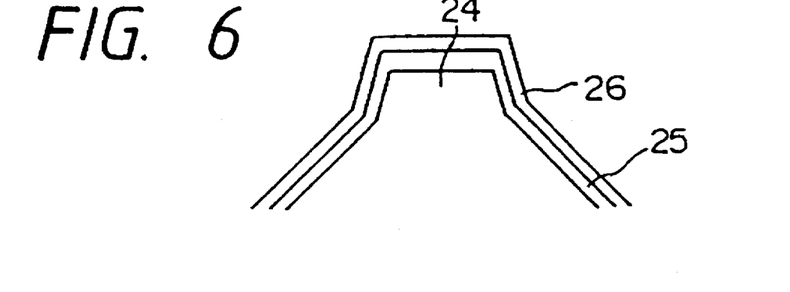
FIG. 6 is a side view showing a magnetic film and a gap layer formed on a part of the recesses and protrusions.

Next, as shown in FIG. 6, a metal magnetic thin film 25 consisting of a soft-magnetic thin film as mentioned above and a gap layer 26 consisting of $SiO_2$ or the like, are formed on each protrusion 24 by a film formation method such as sputtering or vacuum evaporation.

Figure 7:
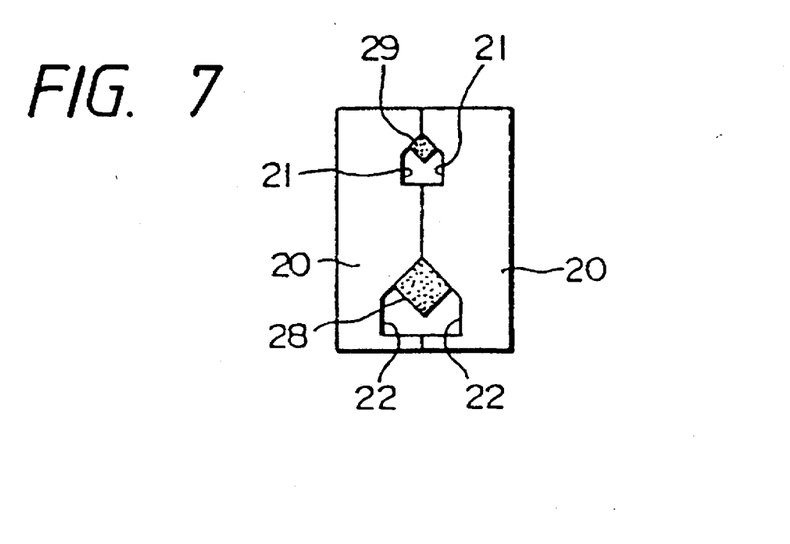
FIG. 7 is a side view showing two core blocks joined together.
Figure 8:
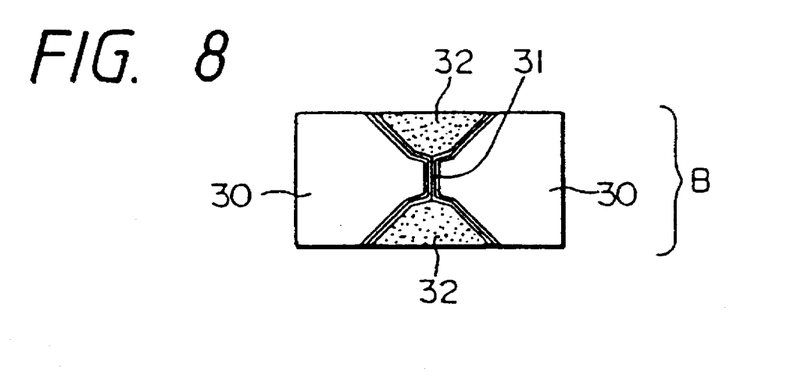
FIG. 8 is a plan view showing the two core blocks joined together.

After the formation of the gap layer 26, the two core blocks 20 are brought into abutment with each other, with their respective winding grooves 21 and reinforcement grooves 22 being opposed to each other, as shown in FIG. 7. Further, the spaces defined between the grooves of the abutting portions are filled with glass 28, 29, thereby integrally joining the core blocks 20 with each other. Next, the core blocks, thus joined together, are cut longitudinally into a plurality of pieces, thereby obtaining magnetic-head original forms B, each of which consists, as shown in FIG. 8, of magnetic cores 30 joined together through the intermediation of a gap 31 by means of glass layers 32. The magnetic cores 30 of the original form B still retain, for example, the distortion imparted thereto during the grooving on the core blocks and the stress imparted thereto during the formation of the metal magnetic thin films 25 by the film formation method.

Figure 2:
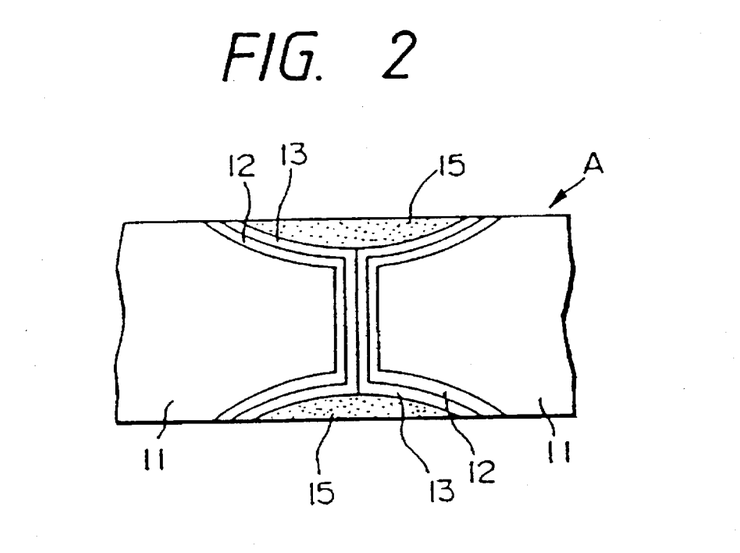
FIG. 2 is a plan view of the magnetic head shown in FIG. 1.

With the above magnetic-head original forms B having been obtained, heat treatment is performed thereon in the conditions described below, thereby obtaining magnetic heads A a shown in FIGS. 1 and 2. This heat treatment is performed in an inert gas atmosphere or, more preferably, in a vacuum atmosphere, for several hours or more at a temperature which is 200° C. or more and which is lower than the transition temperature of the glass composition forming the glass layers 32. This heat treatment eliminates the distortion imparted to the magnetic cores 30, thereby improving the magnetic properties generated by the magnetic cores 30 and the metal magnetic thin films 25.

Further, heat treatment at a temperature of 400° C. or more causes the Al (Si, Cr, Mo, W) existing in the metal magnetic thin films 25 to move toward the surface portions of the films, combine with oxygen and remain in the surface portions. That is, the concentration of the element X in the surface portions of the metal magnetic thin films is augmented as compared to that in the remaining portions of the films. This causes generation of an oxide of the element in the surface portions of the metal magnetic thin films 25, which oxide constitutes oxide coating layers on the surfaces of the metal magnetic thin films 25, thereby improving the corrosion resistance of the films.

TEST EXAMPLE 1

Experimental magnetic heads were produced in accordance with the method of this invention, and output measurement was performed on these magnetic heads. The magnetic heads measured were prepared by forming 6 μm-thick metal magnetic thin films having a composition expressed by the formula: 72Fe-5Al-12Ta-11C and a 0.2 μm-thick gap layer consisting of $SiO_2$, on magnetic cores consisting of an Mn-Zn single crystal ferrite. Magnetic-head original forms are cut out of the Mn-Zn ferrite core blocks and fed in a heating furnace, where they were subjected to heat treatment, which was conducted at temperatures of 200° C., 300° C. and 370° C. in an atmosphere with flowing nitrogen for five hours.

Figure 9:
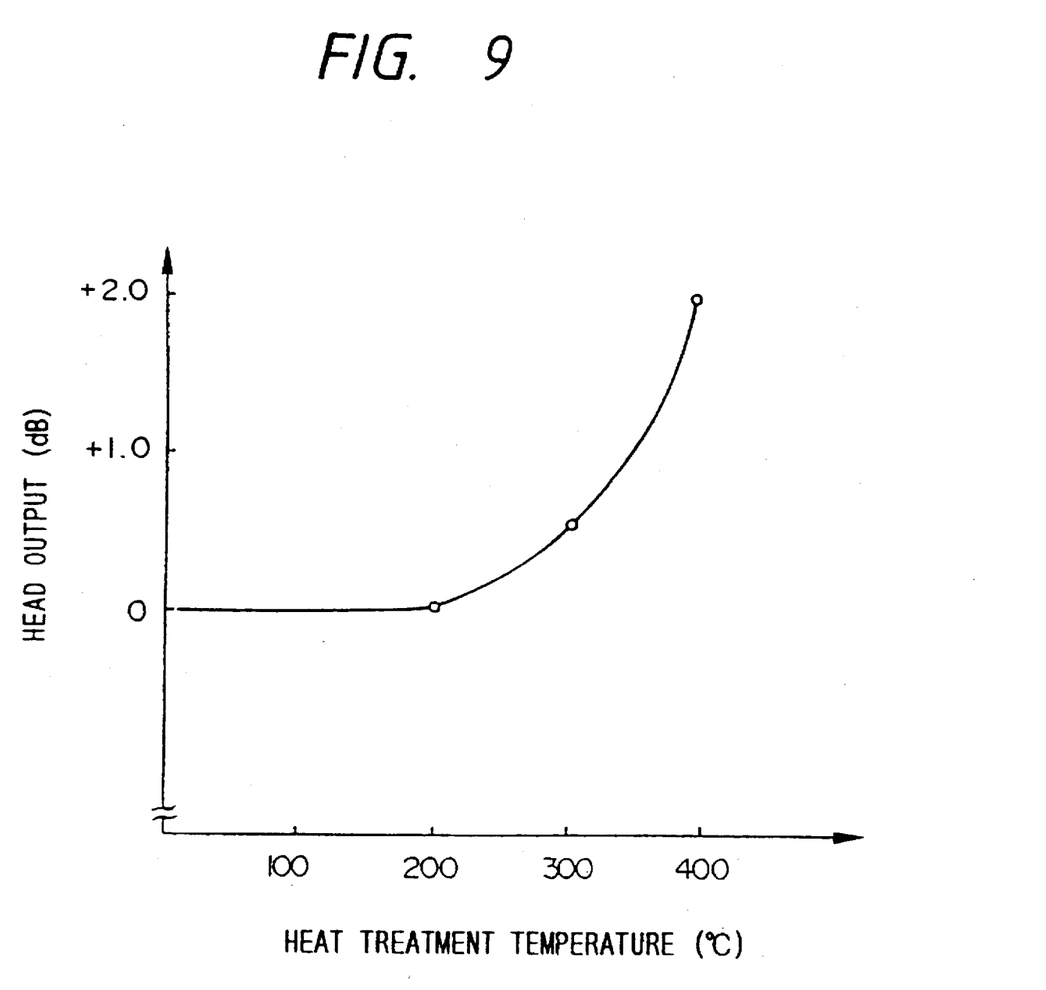
FIG. 9 is a graph showing the results of an output measurement performed on an example of the magnetic core produced.
Figure 10:
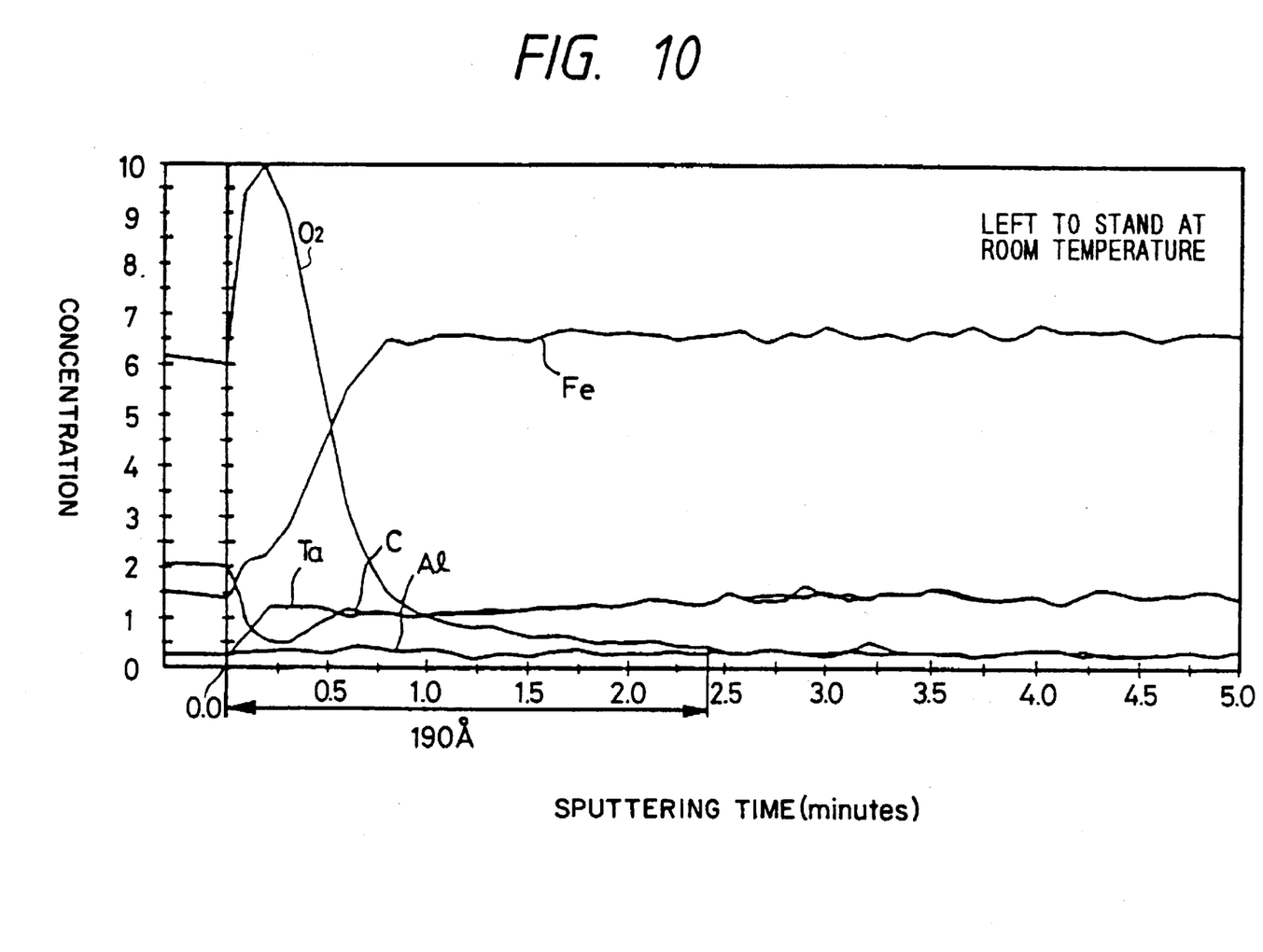
FIG. 10 is a graph showing the concentration distribution at room temperature Of the elements of an example of the magnetic core produced.

FIG. 9 shows the relationship between the head output of the magnetic head and the heat treatment temperature.

As is apparent from FIG. 9, heat treatment at a temperature of 200° C. or more provides an improvement in head output.

TEST EXAMPLE 2

Figure 11:
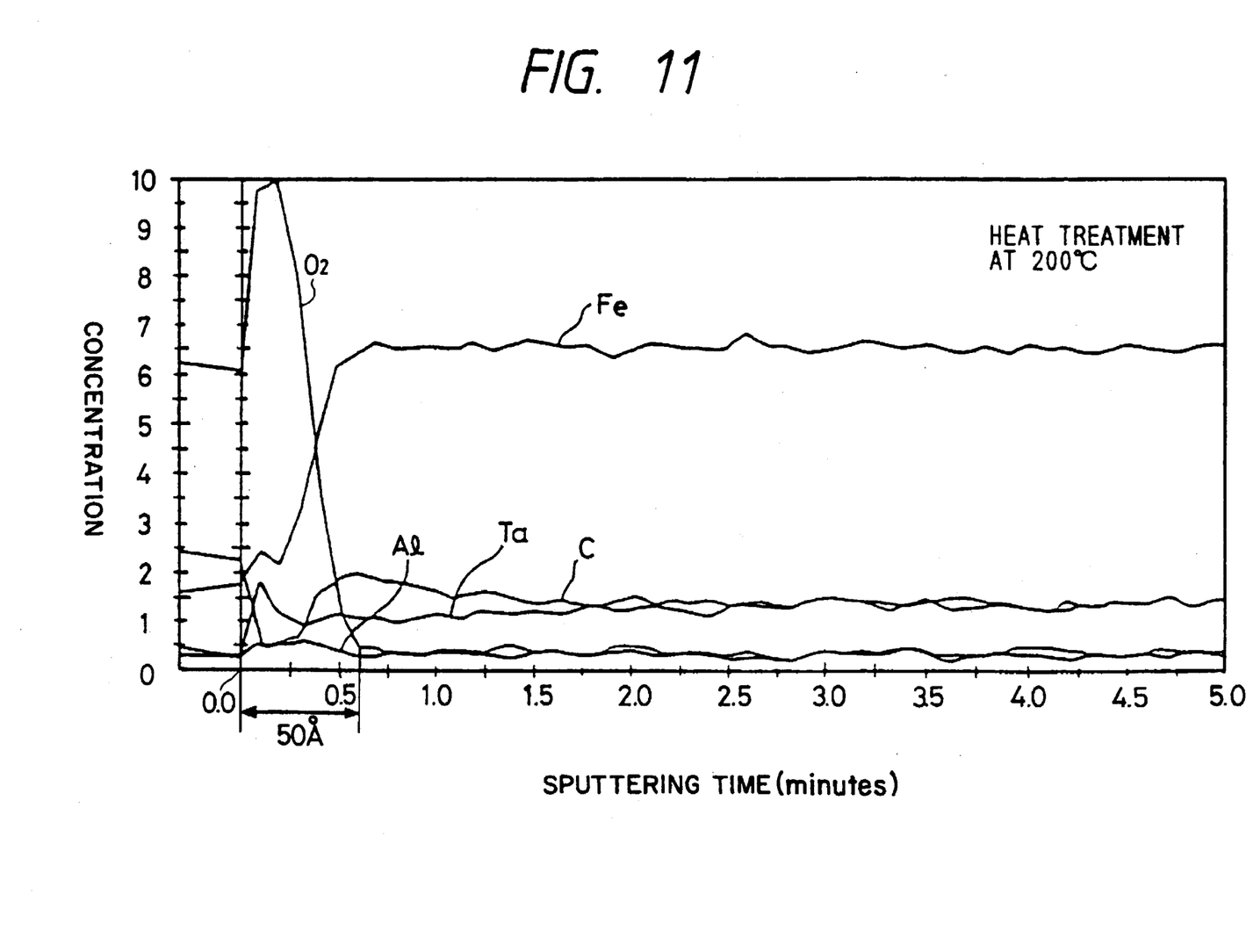
FIG. 11 is a graph showing the concentration distribution in the depth direction, after heat treatment at 200° C., of the elements of an example of the magnetic core produced.
Figure 12:
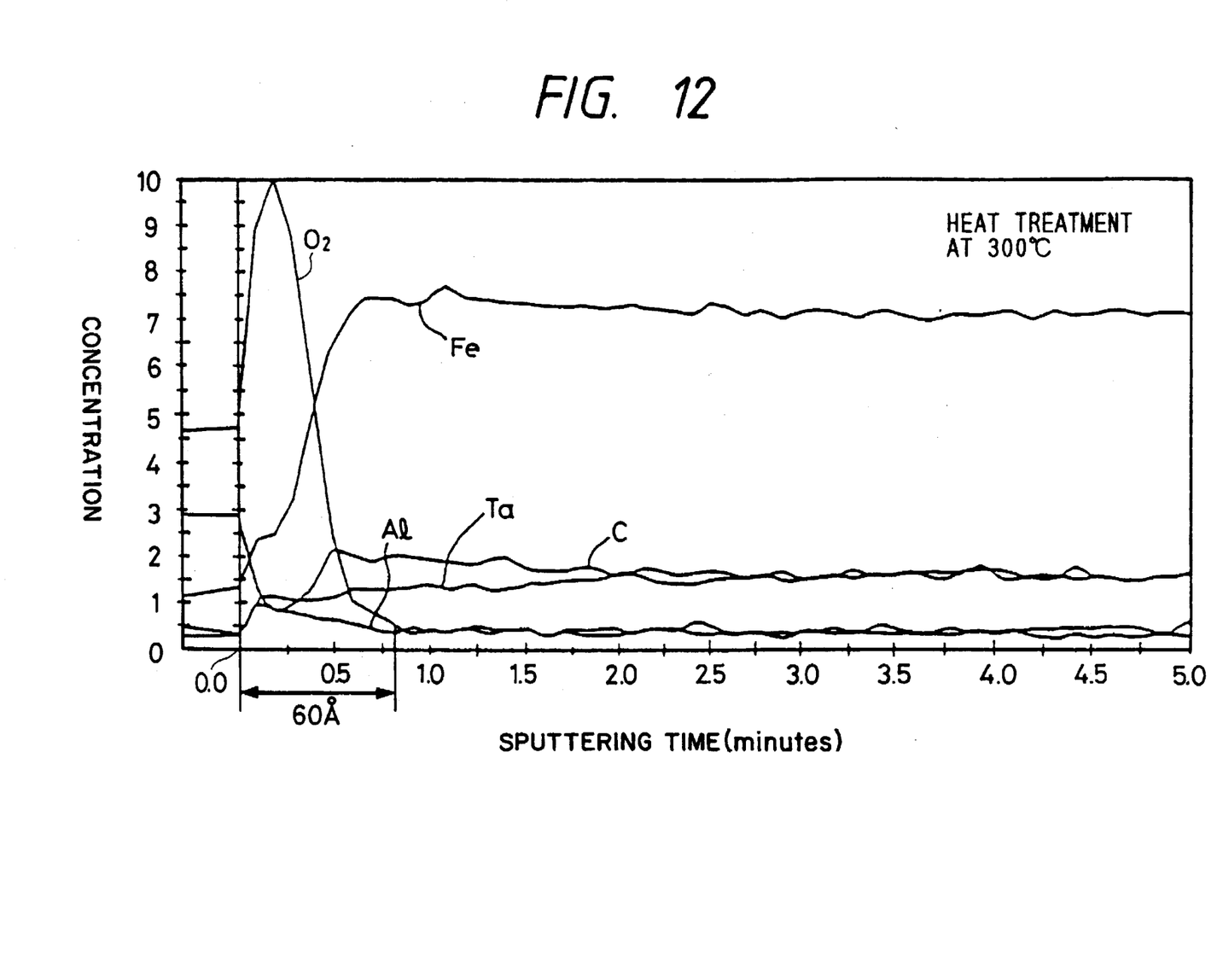
FIG. 12 is a graph showing the concentration distribution in the depth direction, after heat treatment at 300° C., of the elements of an example of the magnetic core produced.
Figure 13:
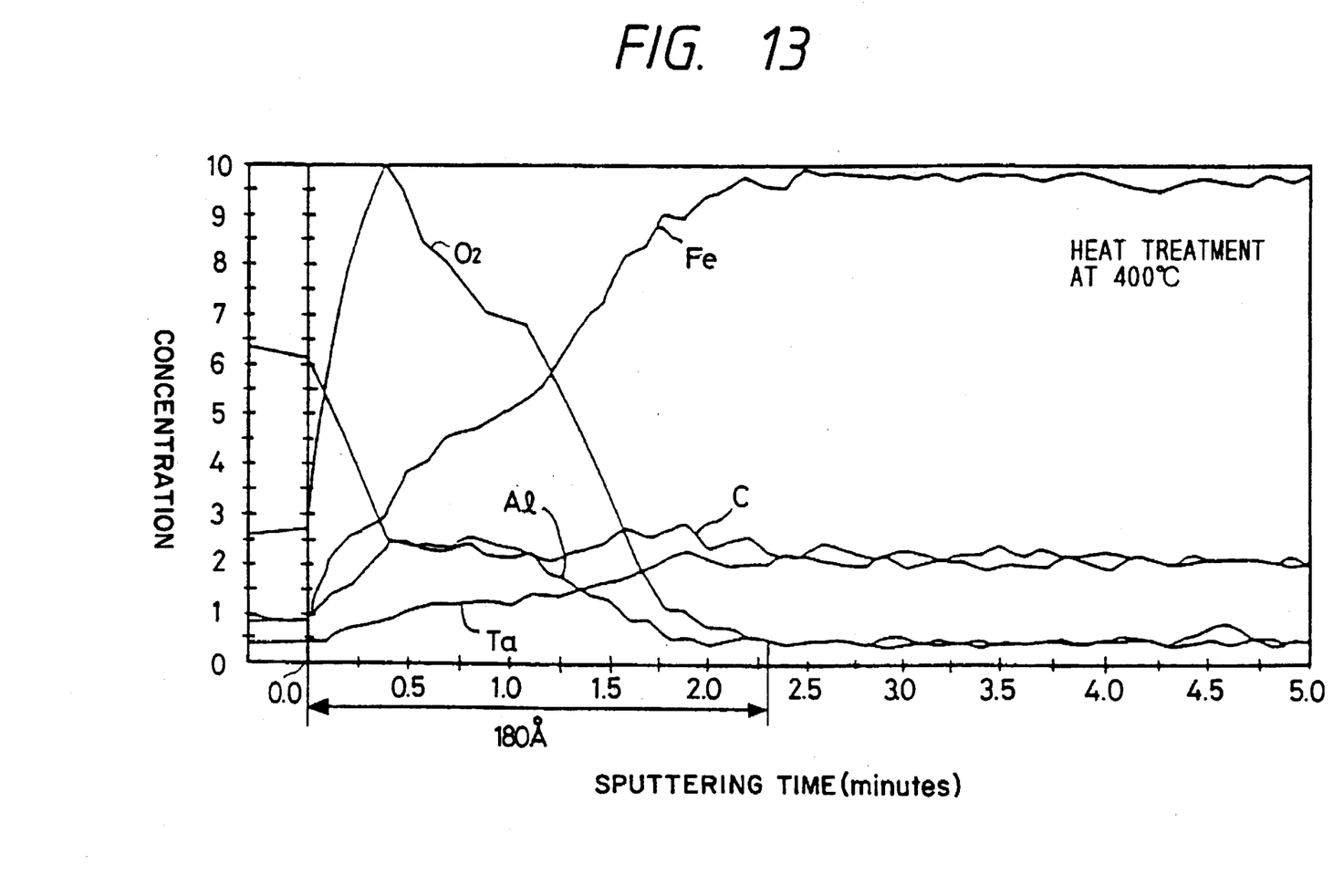
FIG. 13 is a graph showing the concentration distribution in the depth direction, after heat treatment at 400° C., of the elements of an example of the magnetic core produced.

FIGS. 11 through 13 show the results of an Auger electron spectroscopic analysis performed on magnetic heads produced in the same manner as described above and heat-treated at 200° C., those heat-treated at 300° C., and those heat-treated at 400° C.

It is apparent from the results shown in FIGS. 10 through 13, that heat treatment at 400° C. provides an improvement in terms of Al concentration in the surface portions (the portions 180A deep as measured from the surface) of the metal magnetic thin films.

TEST EXAMPLE 3

A corrosion resistance test was performed on the following kinds of specimens of the magnetic head, constructed as described above, each specimen having prepared five pieces: a specimen with metal magnetic thin films containing 7.0 atomic % of Al; a specimen with metal magnetic thin films containing 3.5 atomic % of Al; and a specimen containing no Al. Each magnetic head was immersed in physiological salt solution for 24 hours to check it for any generation of rust on the surface. The test results, are given in Table 1.

In Table 1, symbol ◉ indicates a specimen exhibiting no generation of rust; symbol ◯ indicates a specimen indicating partial generation of rust on some of the five pieces; and symbol △ indicates partial generation of rust on all the five pieces.

TABLE 1

| Al content | Room temperature | 200° C. | 300° C. | 400° |
|---|---|---|---|---|
| 0 | △ | △ | △ | △ |
| 3.5 atomic % | △ | △ | ◯ | ◯ |
| 7.0 atomic % | ◯ | ◉ | ◉ | ◉ |
| 10.0 atomic % | ◯ | ◉ | ◉ | ◉ |
| 15.0 atomic % | ◉ | ◉ | ◉ | ◉ |
| 25.0 atomic % | ◉ | ◉ | ◉ | ◉ |

As is apparent from the results shown in Table 1, a specimen containing 7.0 atomic % or more particularly excels in corrosion resistance. This fact indicates the possibility of obtaining excellent corrosion resistance by performing appropriate heat treatment on a metal magnetic thin film to which a sufficient amount of Al has been added.

TEST EXAMPLE 4

The composition of the metal magnetic thin layers of the magnetic head constructed as described above was varied to measure the magnetic permeability μ, the coercive force Hc and the saturation magnetic flux density Bs thereof with respect to different film compositions. The measurement results are given in Table 2.

| Film composition (atomic %) | | | | | \|μ\| | Hc | Bs |
|---|---|---|---|---|---|---|---|
| Fe | Al | Cr | Ta | C | [MHZ] | (Oe) | (KG) |
| 1 | 75.5 | 1.5 |  | 12.1 | 10.9 | 2460 | 0.2 | 14.7 |
| 2 | 72.7 | 3.6 |  | 11.8 | 11.9 | 1860 | 0.2 | 14.5 |
| 3 | 73.0 | 5.0 |  | 11.5 | 10.5 | 1940 | 0.1 | 14.3 |
| 4 | 72.2 | 5.0 |  | 12.4 | 10.4 | 3030 | 0.3 | 14.0 |
| 5 | 70.8 | 6.7 |  | 12.0 | 10.5 | 2540 | 0.3 | 13.2 |
| 6 | 71.2 | 6.8 |  | 11.2 | 10.8 | 1900 | 0.3 | 13.6 |
| 7 | 67.9 | 6.4 |  | 11.1 | 14.6 | 2950 | 0.4 | 13.3 |
| 8 | 63.6 | 11.1 |  | 13.1 | 12.2 | 3240 | 0.3 | 12.3 |
| 9 | 66.9 | 11.7 |  | 9.6 | 11.8 | 1890 | 0.5 | 12.5 |
| 10 | 61.6 | 15.7 |  | 9.9 | 12.8 | 1140 | 0.2 | 11.3 |
| 11 | 71.3 | 3.0 | 4.2 | 9.2 | 12.3 | 3240 | 0.6 | 13.5 |
| 12 | 68.8 | 6.1 | 4.0 | 9.0 | 12.1 | 2200 | 0.4 | 13.0 |
| 13 | 64.3 | 6.6 | 7.3 | 8.8 | 13.0 | 1260 | 0.8 | 12.5 |

As is apparent from the results shown in Table 2, with a material to be expressed by the composition formula Fe-X-M-C, the magnetic permeability μ and the coercive force Hc thereof are both satisfactory and the saturation magnetic flux density is 10000 G or more when the contents by atomic % of the component elements satisfy the conditions: $0.5 \leq C \leq 25$, $2 \leq M \leq 25$, $0.2 \leq X \leq 25$, and $50 \leq Fe \leq 95$.

TEST EXAMPLE 5

Figure 14:
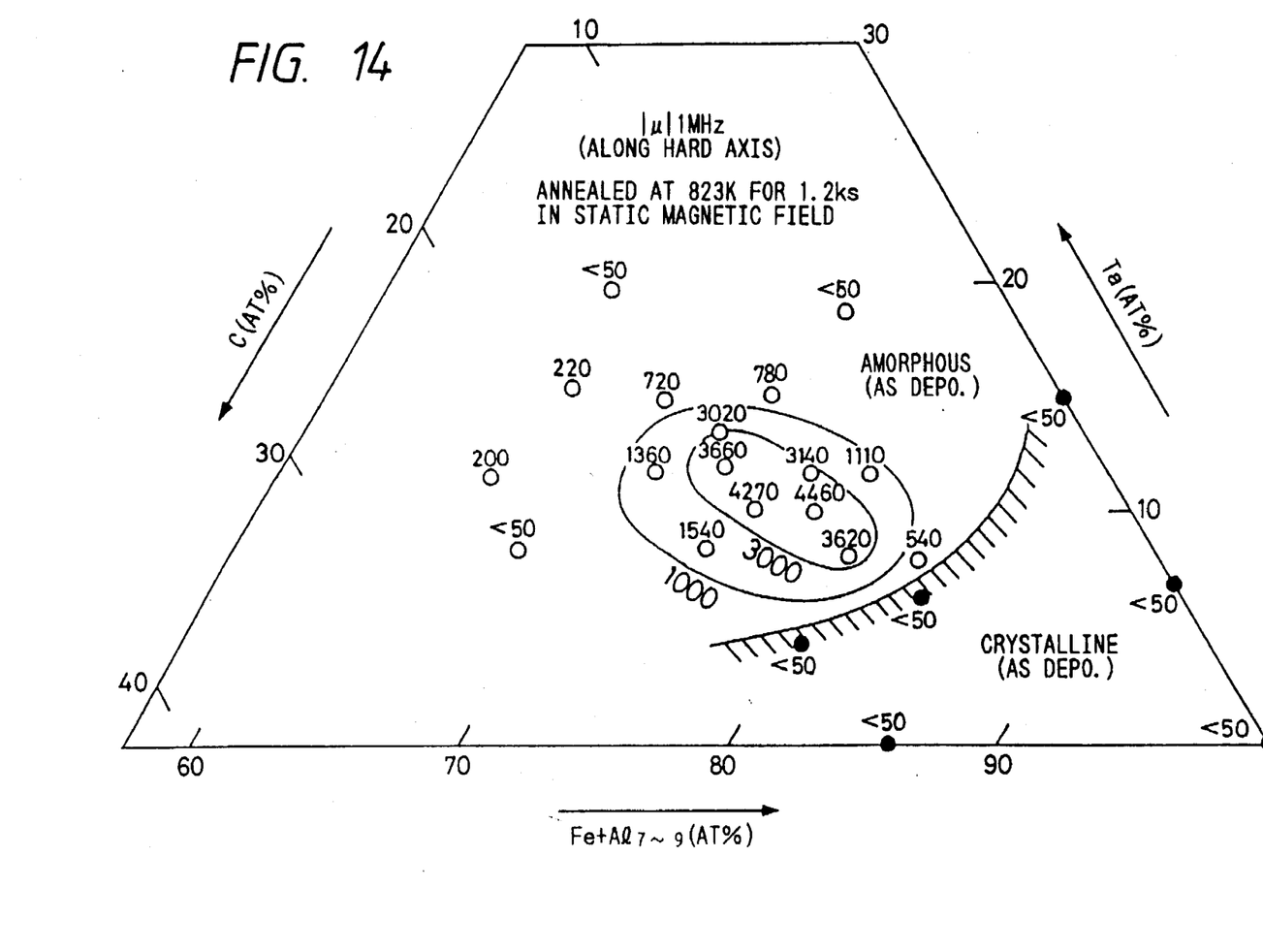
FIG. 14 is a graph showing the results of a magnetic permeability measurement performed on an example of the magnetic core produced.

The magnetic permeability μ of the magnetic head constructed as described above was measured when the Al content by atomic % was as follows: $7 \leq Al \leq 9$. FIG. 14 shows the results of the measurement.

The annealing was effected in a static magnetic field for twenty minutes at an absolute temperature of 823K.

As is apparent from the results shown in FIG. 14, a magnetic permeability of 1000 or more is obtained when the contents by atomic % of the elements of a material represented by the composition formula: Fe-Al-Ta-C satisfy the following conditions: $6 \leq Ta \leq 16$, and $8 \leq C \leq 20$.

TEST EXAMPLE 6

Figure 15:
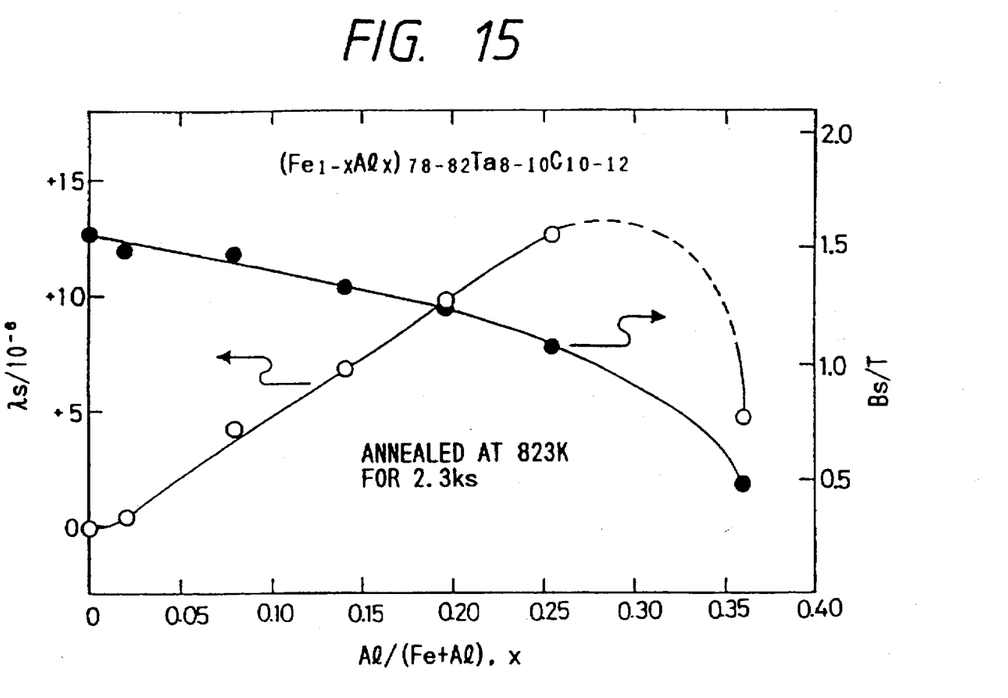
FIG. 15 is a graph showing the results of a magnetostrictive constant measurement and a saturation magnetic flux density measurement performed on an example of the magnetic core produced.

The magnetostrictive constant λs and the saturation magnetic flux density Bs of a magnetic head constructed as described above were measured, with the Al content by atomic % being varied in the range: $0 \leq Al \leq 28.7$. FIG. 15 shows the results of the measurement.

The annealing was conducted for approximately forty minutes at an absolute temperature of 823K.

As is apparent from the results shown in FIG. 15, the more the Al content, the more the magneto striction. It is, however, approximately $13 \times 10^{-6}$ at the maximum. As for the saturation magnetic flux density, it decreases as the Al content increases. This indicates that satisfactory properties for a magnetic head can be obtained when the Al content by atomic % satisfies the condition: $0.2 \leq Al \leq 25$.

Figure 16:
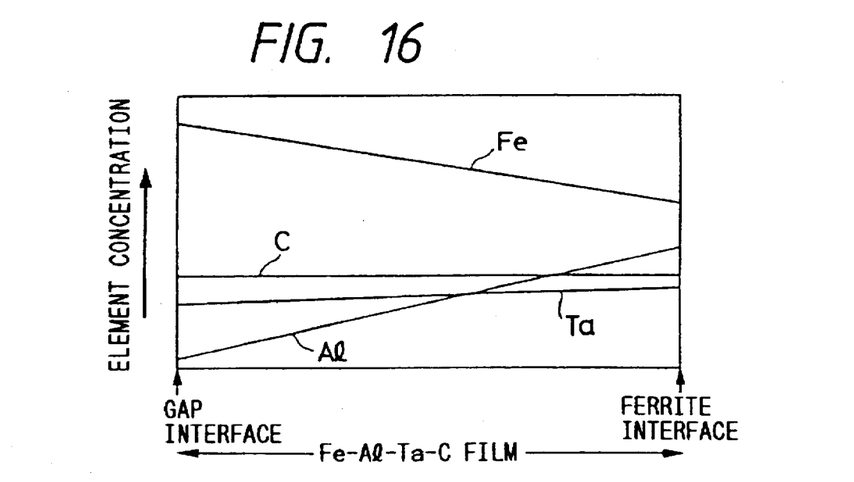
FIG. 16 is a diagram showing the distribution of concentration of the components of the metal magnetic layers of a magnetic head according to the present invention.

Next, a second embodiment of the present invention will be described. The difference between the magnetic head of the present invention and the above-described conventional magnetic head lies in the composition and the structure of the metal magnetic thin films 12. In the magnetic head of the second embodiment, the metal magnetic thin films 12 consist of Fe-Al-Ta-C-type magnetic films. Those portions of the metal magnetic thin films 12 on the side facing the magnetic cores 11 have a relatively high Al concentration, whereas those portions of the metal magnetic thin films 12 on the side facing the magnetic gap have a relatively low Al concentration. FIG. 16 shows an example of the distribution of the concentrations of the components of the metal magnetic thin films 12.

A method of preparing the metal magnetic thin films 12, having the gradient of Al concentration as shown above, will now be described.

First, an Fe-10% Al-Ta-C-type film is formed to a thickness of approximately 1 μm on each of the opposed end surfaces of a pair of ferrite magnetic cores 11 by a film formation method such as vacuum evaporation or sputtering. Then, by a similar method, an Fe-5% Al-Ta-C-type film is formed to a thickness of approximately 5 μm. The metal thin films thus obtained contain a considerable proportion of amorphous phase, so that they are rather unstable. Therefore, heat treatment at a high temperature of approximately 550° C. is performed on the films so as to cause precipitation of crystallites, thereby diffusing the components.

Figure 17:
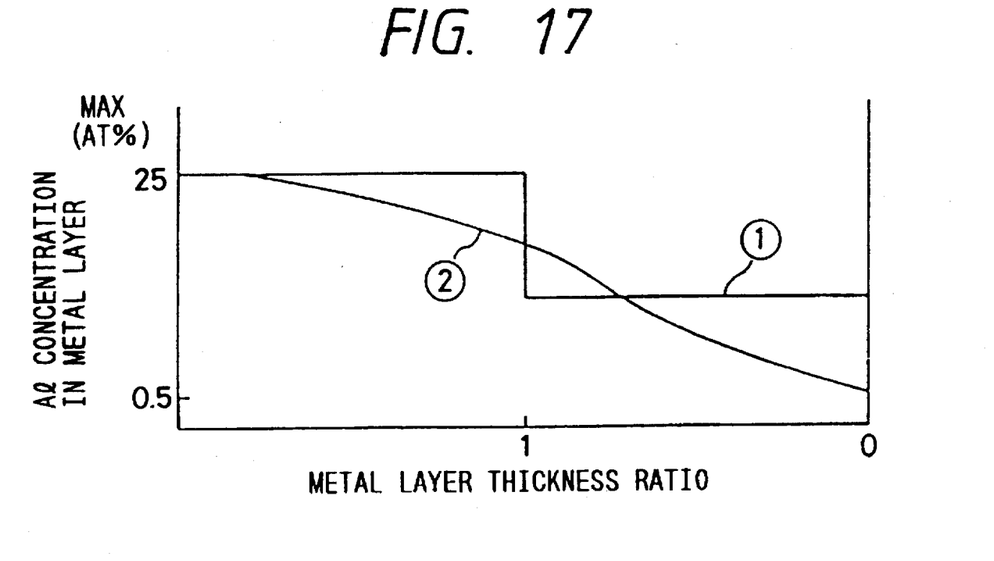
FIG. 17 is a diagram showing the diffusion of Al concentration of the metal magnetic layer in the magnetic head producing process of an embodiment of this invention.

FIG. 17 shows the distribution of Al concentration before and after heat treatment.

The Al concentration distribution ① of the metal layers prior to heat treatment apparently exhibits a bias in Al concentration between the layers, whereas the Al concentration distribution ② of the metal layers after heat treatment exhibits no such bias, forming a smooth concentration gradient between layers.

Thus, the above-mentioned heat treatment can serve for the glass bonding process in the production of the magnetic head.

Although in the above-described method of preparing the metal magnetic thin films 12, the metal magnetic thin films 12 were formed of an Fe-Al-Ta-C-type magnetic film composed of two layers of different Al concentrations, it is also possible to form the metal magnetic thin films 12 by laminating three or more metal magnetic films. When the metal magnetic films 12 are formed by laminating a number of metal magnetic thin films of slightly different Al concentrations, it is possible to obtain an Al concentration exhibiting a smoother gradient.

Thus, with the magnetic head described above, it is possible to avoid the phenomenon of saturation of the recording magnetic field and magnetic field gradient, which phenomenon has conventionally been allowed to occur due to the low saturation magnetic flux density of the magnetic cores, and, due to the presence of a plurality of thin film layers, the high saturation magnetic flux density of these thin film layers (especially those in the vicinity of the magnetic gap) can be effectively utilized, thereby improving the recording magnetic field and the magnetic field gradient. Further, it is possible to ensure satisfactory properties without augmenting the thickness of the metal magnetic thin films, so that the eddy current loss due to an increase in the thickness of the metal magnetic thin films can be avoided. In addition, an increase in the film stress due to any thermal deformation at the time of glass bonding, etc., can be prevented.

However, when imparting a gradient to the Al component concentration of the metal magnetic thin films 12, augmenting the Al content of the metal magnetic thin films 12 results in a reduction in the saturation magnetic flux density of the thin films 12, which causes a deterioration in magnetic properties, so that, when forming a concentration gradient of the Al component in the metal magnetic thin films 12, it is important to set the maximum concentration of the Al component of the metal magnetic thin films to 25 atomic %.

EXPERIMENT EXAMPLE

Figure 18:
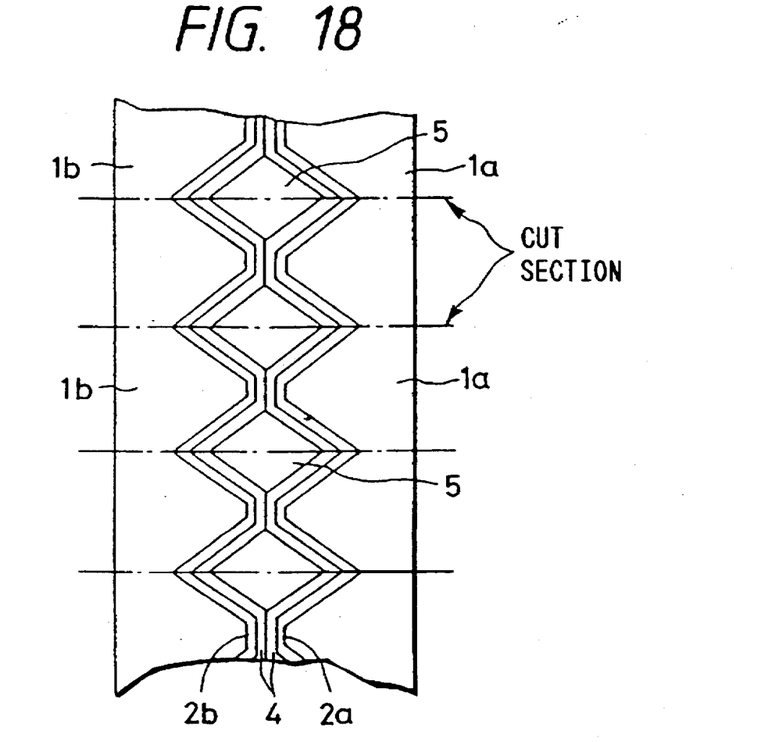
FIG. 18 is a diagram illustrating the film-peeling-ratio measuring method used in this embodiment.

The film peeling-off ratio of the metal magnetic head of this invention, constructed as described above, and that of a comparative example, were measured in the following manner:

In the head chip production process for the magnetic head of this invention, the mechanical force involved in the chip cutting step, illustrated in FIG. 18, is liable to cause film peeling-off. In view of this, the outward appearance of each chip after the chip cutting of the magnetic head of this invention was examined with a microscope to count the number of places were film peeling-off has occurred, and was compared with the results of a similar examination performed on a conventional magnetic head serving as a comparative example, the comparison results being given in Table 3, in which the number of places where film peeling-off occurred in the comparative example is given as a reference value of 100.

Table 3 further shows the results of a measurement of magnetic recording/reproduction properties at 5 MHz performed on the magnetic head of this invention and that of the comparative example.

In the table, the property level of the magnetic head of the comparative example is given as a standard value of 0 dB.

TABLE 3

|  | Film peeling-off ratio | Output at 5 MHz |
|---|---|---|
| Fe76Ta10C14 | 100 | 0 |
| Ferrite/Fe—Al10—Ta—C(5 μm)/ Fe—Al5—Ta—C(10 μm)/gap | 26 | −0.2 dB |
| Fe—Al10—Ta—C | 22 | −2.0 dB. |

As can be seen from Table 3, the magnetic head of the present invention is superior to the comparative, conventional magnetic head in both peeling-off ratio and magnetic properties. Further, a metal magnetic thin film formed of Fe-Al-Ta-C-type metal magnetic films, with the Al concentration of the metal magnetic thin layers being uniform, has a tendency to involve a considerable deterioration in output properties although its film peeling-off ratio is considerably improved as compared to the case where the metal magnetic thin films contain no Al.

The second embodiment, described above, is applicable not only to an Fe-Al-Ta-C-type but also to an Fe-X-M-C-type metal magnetic thin film with the same X-component concentration.

As described above, in the MIG-type magnetic head of this invention, having metal magnetic thin films, the element X is contained at high concentration in the surface portions of the metal magnetic thin films, whereby the element X is caused to combine with oxygen to generate a metal oxide coating, thereby providing a magnetic head excelling in corrosion resistance.

In the case of the magnetic head whose metal magnetic thin films contain Al, the Al concentration is made relatively high in the film surface portions so as to generate an Al oxide, thereby improving the corrosion resistance of the magnetic head. Further, a magnetic head whose Al content is 7 atomic % or more excels in corrosion resistance and, further, provides a large head output and excellent magnetic properties.

Further, by using, as the material of the metal magnetic thin films, a magnetic material which can be represented by the formula: Fe-X-M-C, where X represents one or two or more of the following elements: Al, Si, Cr, Mo and W; and where M represents one or two or more of the following elements: Ti, V, Zr, Nb, Hf and Ta, it is possible to provide a magnetic head which excels in saturation magnetic flux density and which has the satisfactory corrosion resistance and magnetic properties as mentioned above.

Further, in the metal magnetic thin films made of a magnetic material having the composition: Fe-X-M-C, it is desirable that the following relationship, by atomic %, be satisfied: $0.5 \leq C \leq 25$, $2 \leq M \leq 25$, $0.2 \leq X \leq 25$, and $50 \leq Fe \leq 95$.

When producing a magnetic head having metal magnetic thin films, grooving is performed on core blocks, which are bonded together by glass, cut into pieces, and subjected to heat treatment at 200° C. or more, whereby it is possible to remove the distortion involved in the machining procedures performed on the core blocks during production and eliminate the film stress due to the metal magnetic thin films formed on the core blocks during production, thereby making it possible to produce a magnetic head excelling in magnetic properties.

Further, by using, as the material of the metal magnetic thin films, a magnetic material which can be represented by the formula: Fe-X-M-C, where X represents one or two or more of the following elements: Al, Si, Cr, Mo and W; and where M represents one or two or more of the following elements: Ti, V, Zr, Nb, Hf and Ta, it is possible to provide a magnetic head which excels in saturation magnetic flux density and which has the satisfactory corrosion resistance and magnetic properties as mentioned above.

Further, in the metal magnetic thin films made of a magnetic material having the composition: Fe-X-M-C, it is desirable that the following relationship, by atomic %, be satisfied: $0.5 \leq C \leq 25$, $2 \leq M \leq 25$, $0.2 \leq X \leq 25$, and $50 \leq Fe \leq 95$.

Further, when, in the magnetic head formed of the above magnetic material to be expressed by the formula: Fe-X-M-C, the metal magnetic thin films consist of Fe-type metal magnetic thin films containing the element X, and the distribution of the X concentration is such that it is relatively low in the vicinity of the magnetic gap, consisting of $SiO_2$, and relatively high in the vicinity of the magnetic cores, it is possible to utilize the strong bond strength between the Al, which is one of the components of the metal magnetic thin films, and the oxygen in the ferrite, whereby the requisite stability in the inter-layer bonding between the metal magnetic thin layers and the magnetic gap layers is maintained, and it is possible to improve the inter-layer bond strength, the magnetic recording properties, and the transverse rupture strength of the metal magnetic thin films.

Further, with this magnetic head, it is possible to avoid the phenomenon of saturation of the magnetic field and the magnetic field gradient, which phenomenon has conventionally been allowed to occur due to the low saturation magnetic flux density of the magnetic cores, and, due to the presence of a plurality of thin film layers, it is possible to effectively utilize the high saturation magnetic flux density of these thin film layers (in particular, those in the vicinity of the magnetic gap), thereby improving the recording magnetic field and the magnetic field gradient. In addition, it is possible to well ensure the requisite properties without augmenting the thickness of the metal magnetic thin films, thereby avoiding an increase in eddy current loss due to augmentation of the thickness of the metal magnetic thin films and preventing an increase in the film stress due to the thermal deformation during glass bonding, etc.

What is claimed is:

1. A magnetic head comprising:

a pair of magnetic cores;

an Fe-type metal magnetic thin film formed on each of said magnetic cores; and a gap layer consisting of a nonmagnetic oxide formed on said metal magnetic thin films of each of said magnetic cores such that said metal magnetic thin films are arranged between said gap layers and said magnetic cores;

wherein said magnetic cores are bonded such that said gap layers are in mutual contact, the bonded gap layers forming a magnetic gap region;

wherein said metal magnetic thin films consist essentially of a crystalline magnetic material represented by a composition formula Fe-Al-M-C;

wherein component M represents one or more of the elements Ti, V, Zr, Nb, Hf and Ta;

wherein said composition formula satisfies the following conditions by atomic %: $0.5 \leq C \leq 25$, $2 \leq M \leq 25$, $7 < Al \leq 25$, and $50 \leq Fe \leq 95$; and wherein a concentration of Al located inside of the metal magnetic thin film is lower than a concentration of Al located on a surface of the metal magnetic thin film.

* * * * *